(12) United States Patent  
Haga et al.

(10) Patent No.: US 9,041,270 B2
(45) Date of Patent: May 26, 2015

(54) DRIVING APPARATUS

(71) Applicant: TDK Corporation, Minato-ku, Tokyo (JP)

(72) Inventors: Yoshiaki Haga, Tokyo (JP); Masaru Uno, Tokyo (JP)

(73) Assignee: TDK CORPORATION, Tokyo (JP)

( * ) Notice: Subject to any disclaimer, the term of this patent is extended or adjusted under 35 U.S.C. 154(b) by 60 days.

(21) Appl. No.: 13/953,281

(22) Filed: Jul. 29, 2013

(65) Prior Publication Data

US 2014/0035437 A1 Feb. 6, 2014

(30) Foreign Application Priority Data

Aug. 3, 2012 (JP) ................. 2012-172853

(51) Int. Cl.
  *H01L 41/08* (2006.01)
  *H02N 2/00* (2006.01)
  *H02N 2/02* (2006.01)
  *H02N 2/06* (2006.01)
(52) U.S. Cl.
  CPC ............. *H02N 2/0075* (2013.01); *H02N 2/025* (2013.01); *H02N 2/067* (2013.01)
(58) Field of Classification Search
  USPC ........................ 310/317, 316.01, 316.02, 328
  See application file for complete search history.

(56) References Cited

U.S. PATENT DOCUMENTS

| | | | |
|---|---|---|---|
| 5,917,267 A | 6/1999 | Miyazawa et al. | |
| 2008/0179992 A1* | 7/2008 | Noda et al. | 310/317 |
| 2008/0238250 A1* | 10/2008 | Onozuka et al. | 310/317 |

* cited by examiner

*Primary Examiner* — Thomas Dougherty
*Assistant Examiner* — Karen B Addison
(74) *Attorney, Agent, or Firm* — Arent Fox LLP (57) ABSTRACT

A driving apparatus comprises a piezoelectric element (12) expanding and contracting in accordance with a driving pulse signal (40, 42), a supporting shaft (14) connected to said piezoelectric element, a movable body (20) frictionally engaged with said supporting shaft and capable of moving along said supporting shaft, and a driving portion (30) applying said driving pulse signal having a voltage value that corresponds to a driving voltage value (VD) to said piezoelectric element in order to cause relative movement of said movable body to said supporting shaft, wherein a driving voltage waveform (50) showing a time-varying of said driving voltage value has a first dropping portion (55) where said driving voltage value sharply drops from a first value (V1) to a second value (V2), a second dropping portion (56) where said driving voltage value slowly drops from said second value (V2) to a third value (V3) compared with said first dropping portion, and a third dropping portion (57) where said driving voltage value sharply drops from said third value (V3) to a standard value (V0) compared with said second dropping portion.

4 Claims, 9 Drawing Sheets

DRIVING APPARATUS

CROSS-REFERENCE TO RELATED APPLICATIONS

This application claims priority to Japanese Application No. 2012-172853, filed Aug. 3, 2012, the disclosure of the prior application is incorporated in its entirety by reference.

BACKGROUND OF THE INVENTION

1. Field of the Invention

The present invention relates to a driving apparatus that applies a driving signal to a piezoelectric element to move a movable body.

2. Description of the Related Art

The mechanical displacement obtained by the piezoelectric element is relatively minute. Therefore, a driving apparatus using the piezoelectric element is preferably used as actuators which require accuracy and also precise control. As an example of applying the driving apparatus which uses the piezoelectric element, for instance, a driving apparatus which moves an optical system included in an imaging device and the like are exemplified.

However, for the imaging device applying the driving apparatus like the above, operating noises are generated when driving, and that sometimes causes a problem. Specifically, like video recording, when taking images along with sounds, the operating noises generated when driving optical systems interfere with taking environmental sounds, and this has become a problem. As conventional technologies for reducing operating noises of the driving apparatus, for instance, technologies that gradually increases or decreases a driving pulse voltage and the like have been proposed.

Japanese Published Unexamined Application No: H9-191676

For the conventional technologies that gradually increases or decreases the driving pulse voltage, it is effective for reducing the operation noises. However, there is a problem that the movement speed of a movable body significantly decreases and also responsiveness to the control signal significantly decreases.

SUMMARY OF THE INVENTION

The present invention has been made by considering the above situation, and an object of the present invention is to provide a driving apparatus that enables both suppression of the operating noises and a preferable driving performance of the movable body.

In order to achieve the above object, a driving apparatus according to the present invention comprises a piezoelectric element expanding and contracting in accordance with a driving pulse signal, a supporting shaft connected to said piezoelectric element, a movable body frictionally engaged with said supporting shaft and capable of moving along said supporting shaft, and a driving portion applying said driving pulse signal having a voltage value that corresponds to a driving voltage value to said piezoelectric element in order to cause relative movement of said movable body to said supporting shaft, wherein a driving voltage waveform showing a time-varying of said driving voltage value has a first dropping portion where said driving voltage value sharply drops from a first value to a second value, a second dropping portion where said driving voltage value drops from said second value to a third value more slowly than said first dropping portion, and a third dropping portion where said driving voltage value drops from said third value to a standard value more sharply than said second dropping portion.

As a result of earnest consideration regarding technology for reducing the operating noises generated in the driving apparatus, the inventors of the present invention obtained knowledge that a phenomenon, which a movable body itself vibrates due to inertia forces generated when the movable body is stopped, contributes to the operating noises. Therefore, they achieved the driving apparatus according to the present invention that enables both suppression of vibration of the movable body when stopping and ringing caused thereby, and also a preferable driving performance by decreasing the driving voltage value in three phases, from first to third dropping portions, instead of decreasing the driving pulse signal straightaway to a standard value.

Specifically, for the driving apparatus according to the present invention, compared with the conventional technologies that simply gradually change voltage, it enables to promptly stop the movable body by sharply decreasing the voltage to a second value, slowly decreasing the voltage to a third value, and then sharply decreasing the voltage from the third value to a standard value. Further, at the first dropping portion where the voltage value is relatively high, even if the voltage is sharply decreased to quickly decelerate the movable body, it enables effectively to suppress the phenomenon that the movable body vibrates when stopping by slowly decreasing the voltage at a second dropping portion. Furthermore, from the third value to a standard value, it is considered that relative movement of the movable body is hardly caused to a supporting shaft, and the movable body almost stops with respect to the supporting shaft. Therefore, even if the voltage is sharply decreased at the third dropping portion, there are little effects on a phenomenon that the movable body vibrates when stopping.

Further, for instance, said driving voltage waveform may have a first rising portion where said driving voltage value sharply rises from said standard value to a fourth value, a second rising portion where said driving voltage value rises from said fourth value to a fifth value more slowly than said first rising portion, and a third rising portion where said driving voltage value rises from said fifth value to said first value more sharply than said second rising portion.

When the movable body accelerates, in the case that the driving pulse signal is sharply raised, ringing (noise) might be generated. However, when the movable body is accelerated, by increasing the driving voltage value in three phases, from first to third rising portions, it enables a suppression of vibration of the movable body when accelerating and ringing caused thereby, and also enables a preferable driving performance. Specifically, at the first rising portion and the third rising portion, it enables to quickly accelerate the movable body by sharply increasing the voltage, compared with the conventional technologies that simply gradually change voltage. Further, from the standard value to the fourth value, relative movement of the movable body is hardly caused to the supporting shaft. Even if the voltage is sharply increased, there are little adverse effects on ringing generation. Furthermore, at the third rising portion where the movable body is already accelerated to a certain level of speed, even if the voltage is sharply increased, it enables the movable body to continue to accelerate and to move relatively stably. Therefore, there are no adverse effects on ringing generation.

In addition, for said driving voltage waveform, for instance, the shape of said second dropping portion and said second rising portion may be symmetric to each other.

By making the shape of second dropping portion and second rising portion symmetric to each other, it enables to simplify a circuit which is included in the driving portion and that results in cost reduction. Further, it is considered that there is not much difference between voltage that starts to cause relative movement of the movable body to the supporting shaft and voltage that stops its movement. Therefore, it is reasonable to determine the fourth value when accelerating and the second value when decelerating the same, from the aspect of development and design.

Further, for instance, said driving voltage waveform may have a voltage sustaining portion where said driving voltage value is sustained at said first value between said third rising portion and said first dropping portion. Furthermore, when a time length of said voltage sustaining portion is expressed by W1 and a time length of said second dropping portion is expressed by W2, W2/W1 may be in the range of 10 to 100.

At the voltage sustaining portion, the driving voltage is sustained at a first value and that enables to continue to apply high forces to the movable body. This driving apparatus enables to move the movable body at a higher speed. Further, by making a proportion of time length W1 of the voltage sustaining portion and time length W2 of the second dropping portion fall within the predetermined range, it enables to secure enough time for slowly decelerating and stopping the movable body and also enables more effectively to suppress the phenomenon that the movable body vibrates when stopping.

DETAILED DESCRIPTION OF THE INVENTION

Figure 1:
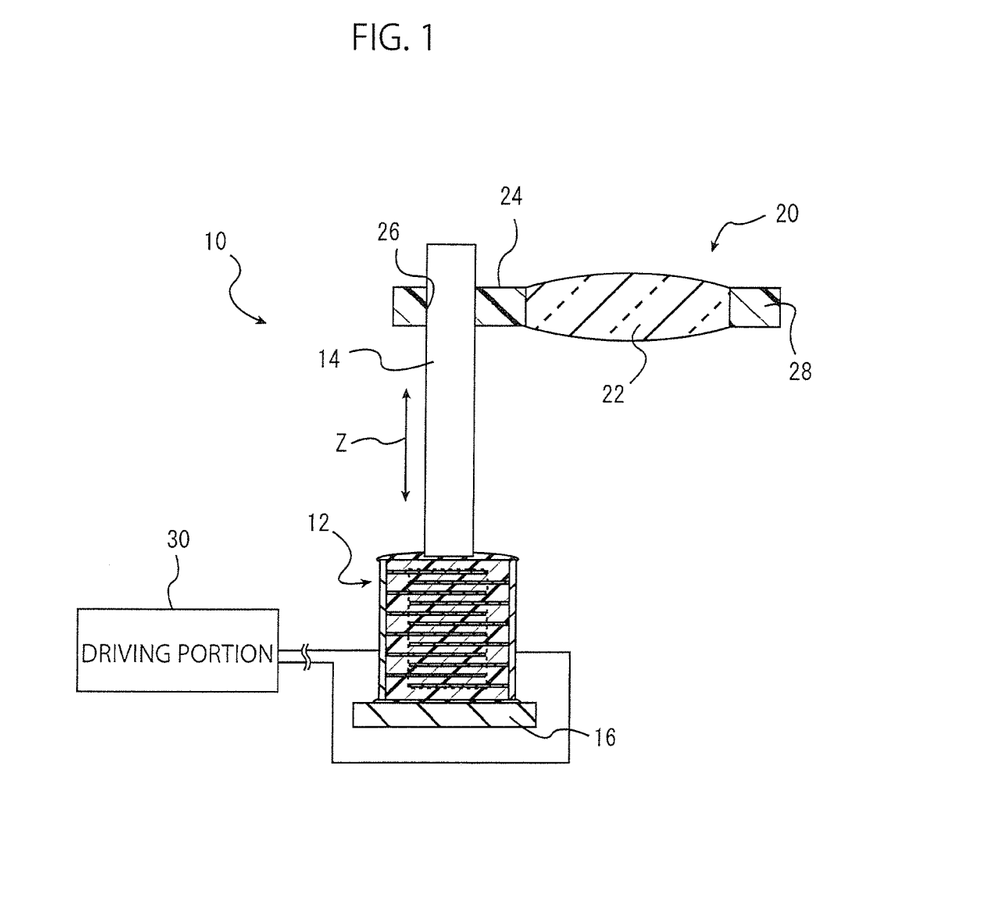
FIG. 1 is a schematic view of a driving apparatus according to one embodiment of the present invention.

FIG. 1 is a schematic view of a driving apparatus 10 according to one embodiment of the present invention. The driving apparatus 10 comprises a piezoelectric element 12, a supporting shaft 14, a weight 16, a movable body 20 and a driving portion 30. The driving apparatus 10 comprises the movable body 20 having optical system 22, and is used as a part of mechanism that moves the optical system 22 in an imaging device. However, the use of the driving apparatus 10 according to the present invention is not limited to this.

The piezoelectric element 12 is expanding and contracting in accordance with a driving pulse signal which is applied by the driving portion 30. For the piezoelectric element 12, for instance, a laminated piezoelectric element that materials having piezoelectricity are laminated while alternately sandwiching electrodes having different polarities can be adopted. However, it is not particularly limited.

The supporting shaft 14 is connected to one end of the piezoelectric element 12, and the weight 16 is connected to the other end of the piezoelectric element 12. The weight 16 functions as an inertia body to cause a displacement to the supporting shaft 14 in accordance with the expansion and contraction of the piezoelectric element 12. Further, the weight 16 may be connected to the other members.

The supporting shaft 14 is displaced in accordance with the expansion and contraction of the piezoelectric element 12. As shown in FIG. 1, the supporting shaft 14 is displaced in the Z direction which is the axial direction of the supporting shaft 14. However, the supporting shaft 14 is connected to the piezoelectric element 12. Therefore, the supporting shaft 14 reciprocates within the range of the amount of expansion and contraction of the piezoelectric element 12.

The movable body 20 frictionally engages with the supporting shaft 14. The movable body 20 is capable of moving in the Z direction along the supporting shaft 14. The movable body 20 comprises a holding frame 24 and an optical system 22 which is held by the holding frame 24. The movable body 20 has a substantially discoid shape and the diametrical direction of the movable body 20 is arranged perpendicular to the Z direction which is the axial direction of the supporting shaft 14.

At one end of the movable body 20, an engagement portion 26 frictionally engaged with the supporting shaft 14 is formed. The movable body 20 has a cantilever supporting structure, that the movable body is supported with respect to the supporting shaft 14 through the engagement portion 26.

The movable body 20 can be displaced jointly with the supporting shaft 14. However, the movable body 20 also can be displaced beyond the range of the amount of expansion and contraction of the piezoelectric element 12 by relatively moving with respect to the supporting shaft 14. For instance, when the supporting shaft 14 is displaced at low speed, the engagement of the movable body 20 and the supporting shaft 14 is maintained and the movable body 20 is displaced together with the supporting shaft 14. However, when the supporting shaft 14 is displaced at high speed, a sliding displacement is caused between the movable body 20 and the supporting shaft 14, and a relative movement is caused between the movable body 20 and the supporting shaft 14. Therefore, by causing an asymmetric reciprocating motion, which has different speeds for back and forth movements, of the supporting shaft 14, the driving apparatus 10 enables the movable body 20 frictionally engaged with the supporting shaft 14 to move beyond the range of the amount of expansion and contraction of the piezoelectric element 12.

Figure 2:
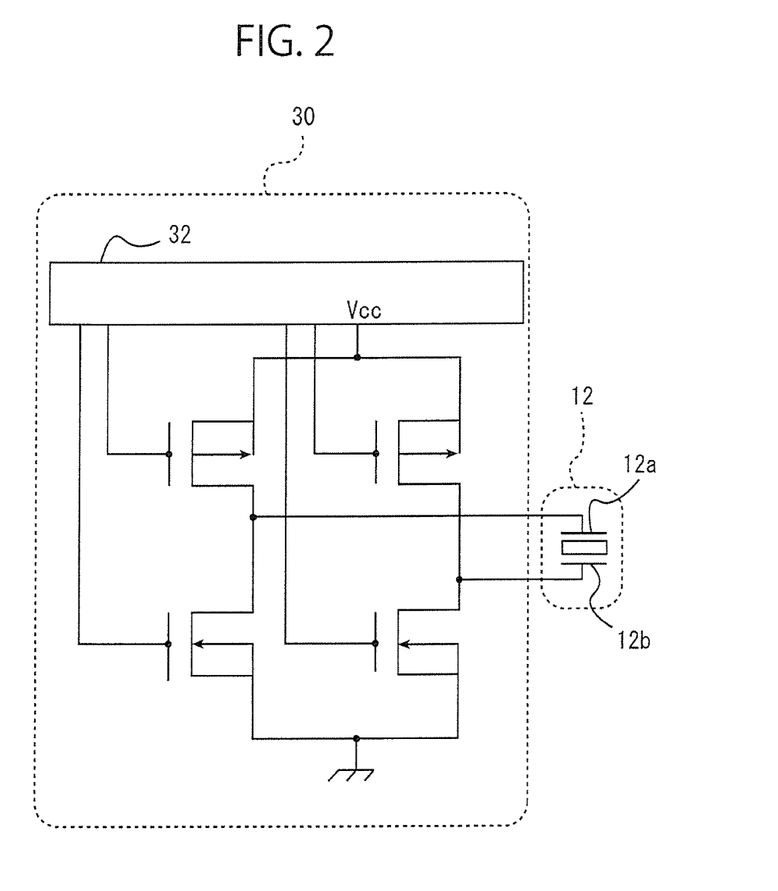
FIG. 2 is a circuit diagram showing an example of internal configuration of a driving portion shown in FIG. 1.
Figure 3:
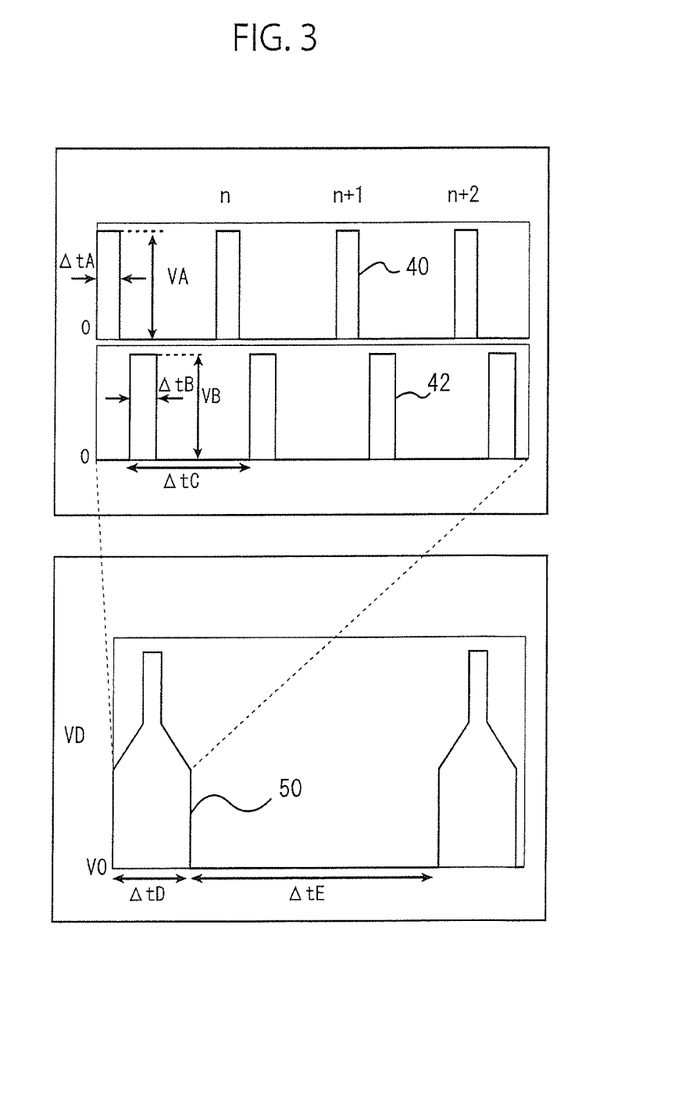
FIG. 3 is a schematic diagram showing the relation between a driving pulse signal and a driving voltage waveform.

The driving portion 30 applies a driving pulse signal (refer to FIG. 3) to the piezoelectric element 12. FIG. 2 is a circuit diagram showing an example of internal configuration of the driving portion 30 shown in FIG. 1. The driving portion 30 comprises a control portion 32, and the control portion 32 controls voltage which is applied to a transistor terminal included in the driving portion 30. The driving portion 30 applies a first driving pulse signal 40 and a second driving pulse signal 42 as shown in FIG. 3 to a first electrode 12a and a second electrode 12b included in the piezoelectric element 12 and having different polarities each other. Further, for the driving portion 30, it is not limited to the example shown in a circuit diagram of FIG. 2. Specifically, the driving portion 30 can be replaced with any other driving portion which can apply the driving pulse signal changing the voltage of the piezoelectric element 12. In addition, for the driving pulse signals 40, 42, it will hereinafter be described in detail.

In an imaging device provided with the driving apparatus 10 shown in FIG. 1, an imaging element (not shown) that leads a light beam transmitted through an optical system 22 is arranged. The driving portion 30 enables to change an optical distance between the optical system 22 held by the movable body 20 and the imaging element, by applying the driving pulse signals 40, 42 shown in FIG. 3 to the first electrode 12a and the second electrode 12b of the piezoelectric element 12.

The upper graph of FIG. 3 shows a first driving pulse signal 40 applied to a first electrode 12a and a second driving pulse signal 42 applied to a second electrode 12b of the piezoelectric element 12 by the driving portion 30 shown in FIG. 2. As shown in FIG. 3, the first driving pulse signal 40 and the second driving pulse signal 42 have voltage values VA, VB that corresponds to a driving voltage value VD (the lower graph of FIG. 3). In the present embodiment, the voltage value VA and the voltage value VB are the same. However, the voltage value VA and the voltage value VB do not necessarily have to be the same. For instance, either one of the voltage value VA or the voltage value VB may be the same with the driving voltage value VD, and the other one may have the value multiplied by a predetermined proportion with respect to the driving voltage value VD.

A pulse width ΔtA of the first driving pulse signal 40 and a pulse width ΔtB of the second driving pulse signal 42 mutually have different values. The piezoelectric element 12, to which these driving pulse signals 40, 42 are applied, enables to cause a relative movement of the movable body 20 with respect to the supporting shaft 14 by producing an asymmetric reciprocating motion that has different speeds for back and forth movements. Further, although the application cycle ΔtC of the first driving pulse signal 40 and the second driving pulse signal 42 is not particularly limited, for instance, it can be determined in the range of 6 to 8 μs.

The lower graph of FIG. 3 shows a driving voltage waveform 50 that indicates a time-varying of the driving voltage value VD. The vertical axis in the lower graph of FIG. 3 indicates the driving voltage value VD. As previously mentioned, the voltage value VA and the voltage value VB of the first driving pulse signal 40 and the second driving pulse signal 42 shown in the upper graph of FIG. 3 correspond to the driving voltage value VD, and these two voltage values vary along with time in accordance with the driving voltage waveform 50. For the scale of the horizontal axis in the lower graph of FIG. 3, it is larger than that of the upper graph of FIG. 3. Further, a plurality of the first driving pulse signal 40 and the second driving pulse signal 42 are applied during a pulse application time ΔtD in the lower graph of FIG. 3.

In the present embodiment, the standard value V0 shown in FIG. 3 is equivalent to ground voltage of a circuit diagram shown in FIG. 2. Therefore, at a time when the driving voltage value VD is a predetermined value which is larger than the standard value V0 (the time corresponding to the pulse application time ΔtD), the driving pulse signals 40, 42 having predetermined voltage values VA, VB which are equivalent to the driving voltage value VD are applied to the piezoelectric element 12. Further, at a time when the driving voltage value VD is equivalent to the standard value V0 (the time corresponding to the pulse pause time ΔtE), the voltage values VA, VB of the driving pulse signals 40, 42 become 0 and the electric potential of the electrodes 12a, 12b of the piezoelectric element 12 does not change. Furthermore, although the pulse application time ΔtD is appropriately determined in accordance with the amount of movement of the movable body 20, for instance, it can be determined in the range of 3 to 6 ms.

Figure 4:
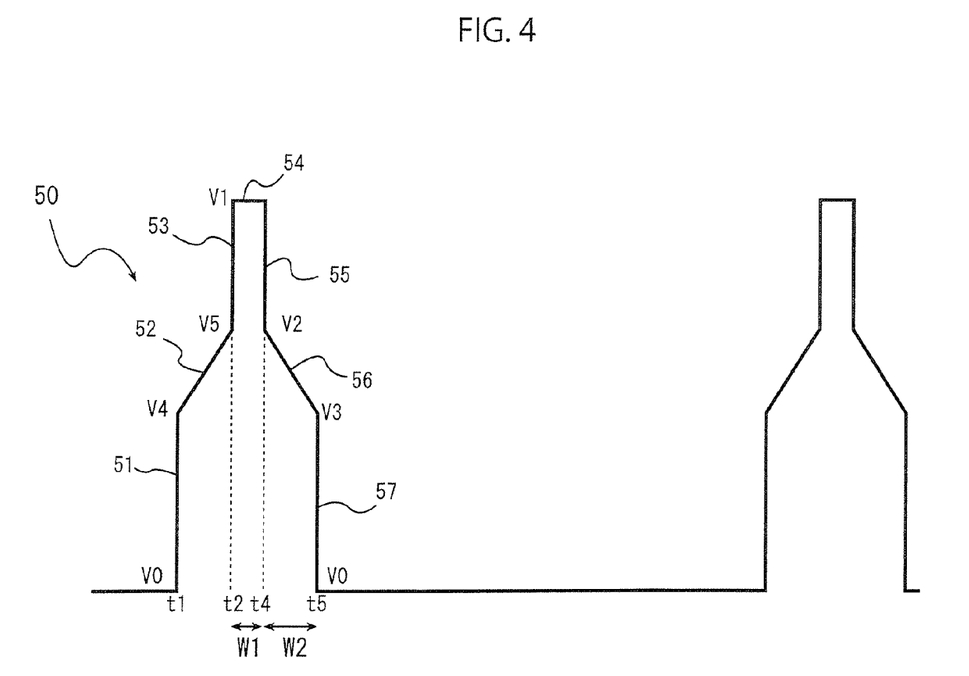
FIG. 4 is a schematic diagram explaining the details of the driving voltage waveform shown in FIG. 3.

FIG. 4 is a schematic diagram showing the details of the driving voltage waveform 50 shown in FIG. 3. The driving voltage waveform 50 has a first rising portion 51 where the driving voltage value VD sharply rises from a standard value V0 to a fourth value V4, a second rising portion 52 where the driving voltage value VD slowly rises from the fourth value V4 to a fifth value V5, and a third rising portion where the driving voltage value VD sharply rises from the fifth value V5 to a first value V1.

At the first rising portion 51 of the driving voltage waveform 50, the driving voltage value VD sharply rises from the standard value V0 to the fourth value V4. The voltage rising rate per unit time at the first rising portion 51 is not particularly limited as long as the rate is larger than that of the second rising portion 52. However, for instance, it enables to determine the voltage values VA, VB of the driving pulse signals 40, 42 (n) right before the time t1 as a standard value V0, and the voltage values VA, VB of the driving pulse signals 40, 42 (n+1) right after the time t1 as the fourth value V4.

At the second rising portion 52 of the driving voltage waveform 50, the driving voltage value VD slowly rises from the fourth value V4 to the fifth value V5. The voltage rising rate per unit time at the second rising portion 52 is not particularly limited, provided that the rate is smaller than that of the first rising portion 51 and is larger than 0. At the second rising portion 52, the driving voltage value VD gradually rises. Therefore, the voltage values VA, VB (refer to FIG. 3) of the driving pulse signals 40, 42 also gradually rise in response to the driving voltage value VD.

At the third rising portion 53 of the driving voltage waveform 50, the driving voltage value VD sharply rises from the fifth value V5 to the first value V1. The voltage rising rate per unit time at the third rising portion 53 is not particularly limited as long as the rate is larger than that of the second rising portion 52. However, for instance, it enables to determine the voltage values VA, VB of the driving pulse signals 40, 42 (n) right before the time t2 as the fifth value V5, and the voltage values VA, VB of the driving pulse signals 40, 42 (n+1) right after the time t2 as the first value V1.

Further, the driving voltage waveform 50 comprises a voltage sustaining portion 54 where the driving voltage value VD is sustained at the first value V1. The voltage sustaining portion 54 is positioned between the third rising portion 53 and the first dropping portion 55. Further, at the voltage sustaining portion 54, the voltage values VA, VB (refer to FIG. 3) of the driving pulse signals 40, 42 are sustained at the first value V1.

Furthermore, the driving voltage waveform 50 comprises a first dropping portion 55 where the driving voltage value VD sharply drops from the first value V1 to the second value V2, a second dropping portion 56 where the driving voltage value VD slowly drops from the second value V2 to the third value V3, and a third dropping portion 57 where the driving voltage value VD sharply drops from the third value V3 to the standard value V0.

At the first dropping portion 55 of the driving voltage waveform 50, the driving voltage value VD sharply drops from the first value V1 to the second value V2. The voltage dropping rate per unit time at the first dropping portion 55 is not particularly limited as long as the rate is larger than that of the second dropping portion 56. However, for instance, it enables to determine the voltage values VA, VB of the driving pulse signals 40, 42 (n) right before the time t4 as the first value V1, and the voltage values VA, VB of the driving pulse signals 40, 42 (n+1) right after the time t4 as the second value V2.

At the second dropping portion 56 of the driving voltage waveform 50, the driving voltage value VD slowly drops from the second value V2 to the third value V3. The voltage dropping rate (absolute value) per unit time at the second dropping portion 56 is not particularly limited as long as the rate is smaller than that of the first dropping portion 55 and is larger than 0. At the second dropping portion 56, the driving voltage value VD gradually drops. Therefore, the voltage values VA, VB (refer to FIG. 3) of the driving pulse signals 40, 42 also gradually drop in response to the driving voltage value VD.

At the third dropping portion 57 of the driving voltage waveform 50, the driving voltage value VD sharply drops from the third value V3 to the standard value V0. The voltage dropping rate per unit time at the third dropping portion 57 is not particularly limited as long as the rate is larger than that of the second dropping portion 56. However, for instance, it enables to determine the voltage values VA, VB of the driving pulse signals 40, 42 (n) right before the time t5 as the third value V3, and the voltage values VA, VB of the driving pulse signals 40, 42 (n+1) right after the time t5 as the standard value V0.

In the driving voltage waveform 50, it is possible individually to determine the shape of the first to third rising portions 51 to 53 and the first to third dropping portions 55 to 57. However, in an example shown in FIG. 4, the second rising portion 52 and the second dropping portion 56 mutually have a symmetrical shape. By making the second rising portion 52 and the second dropping portion 56 have a symmetrical shape, the absolute value of the voltage rising rate at the second rising portion 52 and the voltage dropping rate at the second dropping portion 56 becomes the same. With this, it enables to simplify the circuit which is included in the control portion 32 of the driving portion 30, and that results in cost reduction. Further, as shown in the followings, it is reasonable to determine the third value V3 same with the fourth value V4, and the second value V2 same with the fifth value V5 in the driving voltage value VD, from the aspect of the prevention of ringing.

Figure 8:
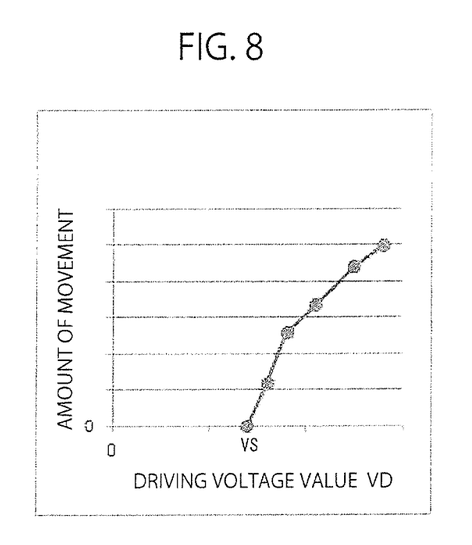
FIG. 8 is a graph showing the relation between the driving voltage value and the amount of movement of the movable body.

FIG. 8 shows the relation (measured value) between the driving voltage value VD and the amount of movement of the movable body 20 which is generated when applying the driving pulse signals 40, 42 having the voltage values VA, VB that corresponds to the driving voltage value VD at a predetermined time. As shown in FIG. 8, in the range that the voltage exceeds the predetermined value, the amount of movement tends to increase along with a rise of the driving voltage value VD. However, in the range that the voltage falls below the predetermined value, a relative movement of the movable body 20 is not caused with respect to the supporting shaft 14 even if the driving voltage value VD is changed.

Therefore, it is preferable that the third value V3 and the fourth value V4 of the driving voltage waveform 50 shown in FIG. 4 are close to the voltage value VS (refer to FIG. 8) that the relative movement of the movable body 20 is caused. With this, it enables to quickly move the movable body 20 by sharply increasing and decreasing the voltage. Further, the relative movement of the movable body 20 is not caused in the range that the voltage falls below the voltage value VS. Therefore, there are little effects on the phenomenon that ringing is generated in response to the vibration of the movable body 20, even if the voltage is sharply increased and decreased in the range that the voltage falls below the third value V3 and the fourth value V4.

Figure 9:
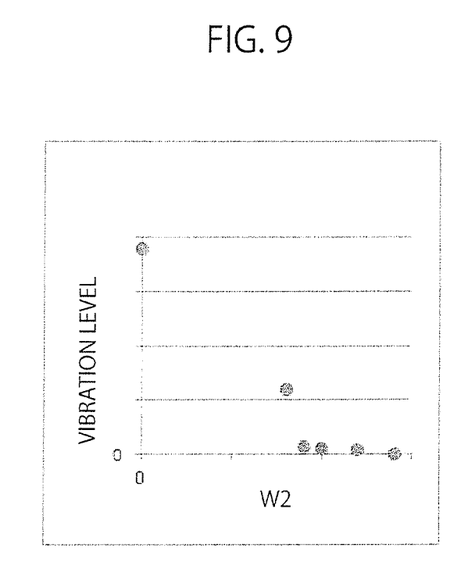
FIG. 9 is a graph showing the relation between a time length W2 of a second dropping portion of the driving voltage waveform and the amount of vibration of the movable body generated when stopping.

FIG. 9 shows how the vibration generating to the movable body 20 changes, when the time length W2 of the second dropping portion 56 (and the second rising portion 52) is changed in a state that the inclination of the second dropping portion 56 (second rising portion 52), the third value V3 (the fourth value V4) and the time length W1 of the voltage sustaining portion 54 of the driving voltage waveform 50 shown in FIG. 4 are fixed. The horizontal axis of FIG. 9 indicates a time length W2 of the second dropping portion 56 of the driving voltage waveform 50, and the vertical axis of FIG. 9 indicates a vibration level generating to the movable body 20 when stopping, when the movable body 20 is driven by using the driving voltage waveform 50. As seen in a leftward portion of FIG. 9, in the range that the time length W2 of the second dropping portion 56 is relatively short, the vibration of the movable body 20 gets smaller as the time length W2 gets longer.

However, as seen in a rightward portion of the graph of FIG. 9, in the range that the time length W2 of the second dropping portion 56 is above a certain length, the vibration of the movable body 20 is hardly seen and little changes are caused to the vibration level of the movable body 20, even if the time length W2 of the second dropping portion 56 is changed. Specifically, it is considered sufficient from the aspect of the prevention of ringing if the time length W2 of the second dropping portion 56 can be ensured more than a predetermined length with respect to the time length W1 of the voltage sustaining portion 54. For instance, when the time length of the voltage sustaining portion 54 is expressed by W1 and the time length of the second dropping portion 56 is expressed by W2, it is preferable that W2/W1 is in the range of 10 to 100, from the aspect of achieving a balance of prevention of ringing and driving performance.

Figure 5:
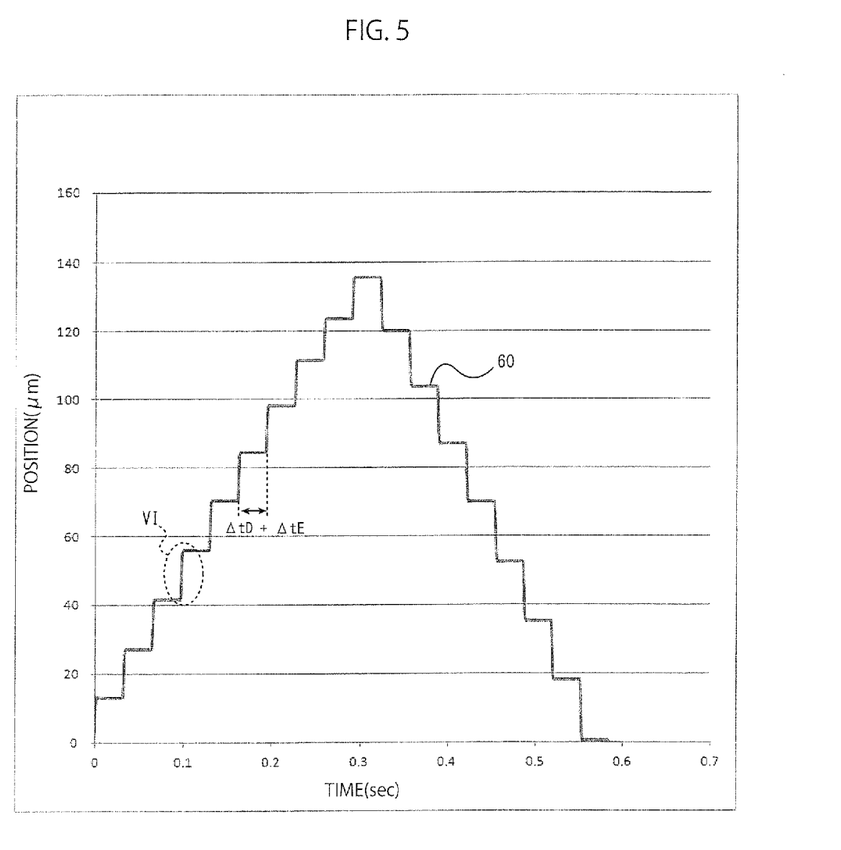
FIG. 5 is a graph showing a driving example of a movable body which is implemented by using the driving apparatus shown in FIG. 1.
Figure 6:
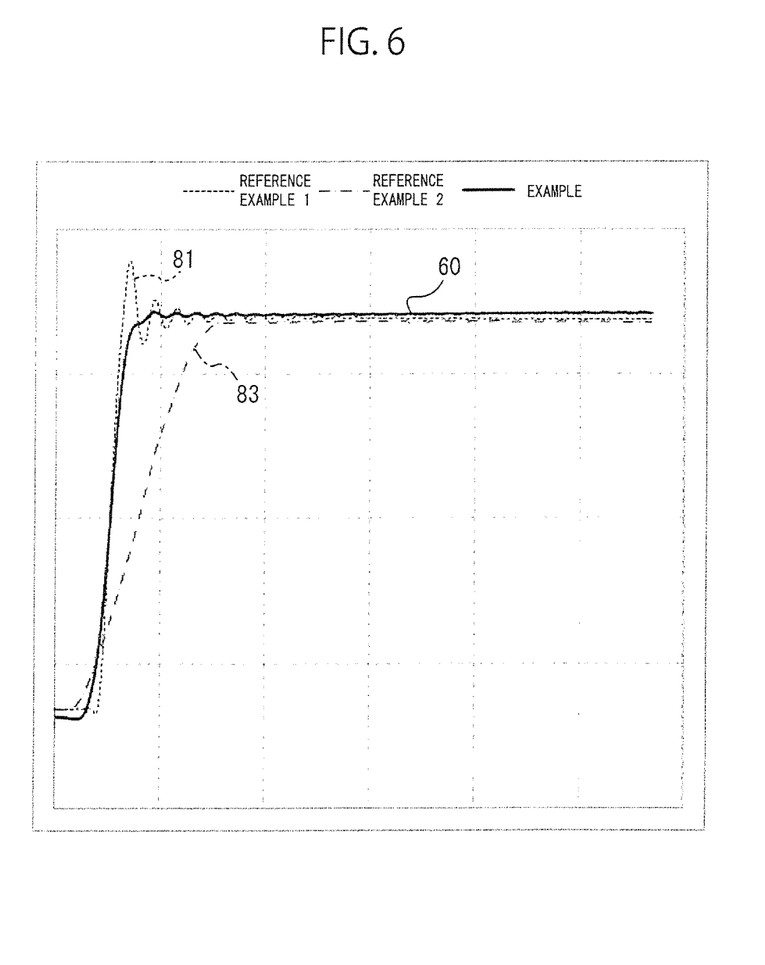
FIG. 6 is a graph showing a behavior of the movable body, which is driven by the driving apparatus according to examples and reference examples, observed when stopping.

FIG. 5 and FIG. 6 show a result of driving of the driving apparatus 10 according to example that the movable body 20 shown in FIG. 1 is moved by using the driving voltage waveform 50 and the driving pulse signals 40, 42 shown in FIG. 3 and FIG. 4. The vertical axis of FIG. 5 and FIG. 6 shows a position of movable body edge 28 (refer to FIG. 1), which is the part of the movable body 20 where especially the vibration is easily caused. Further, the horizontal axis shows a time-varying. In examples, a driving cycle (corresponding to the sum of the pulse application time $\Delta tD$ and the pulse pause time $\Delta tE$ of FIG. 3) is determined as 33.3 ms to intermittently move the movable body 20.

The graph shown with solid line 60 in FIG. 6 is what a part of graph of FIG. 5 is enlarged. FIG. 6 shows a result of driving of example along with a result of driving of reference example 1 (dotted line 81) and reference example 2 (dashed line 83). In reference example 1, the movable body 20 is moved by using the driving voltage waveform 80 shown in FIG. 7(a). Further, in reference example 2, the movable body 20 is moved by using the driving voltage waveform 82 shown in FIG. 7(b). In addition, for the driving according to reference examples 1 and 2, conditions other than the driving voltage waveform are the same with example.

In the result of driving of example shown with solid line 60 in FIG. 6, it can be seen that the vibration generating to the movable body 20 is drastically suppressed compared with the result of driving according to reference example 1 shown with dotted line 81. In the result of driving according to reference example 1 shown with dotted line 81, it can be seen that the movable body 20 vibrates largely when stopping. However, in the result of driving of example shown with solid line 60, it can be seen that the movable body 20 hardly vibrates. Further, for the movement speed of the movable body 20, there is no much difference between example and reference example 1.

Considering the time required for a vibration damping, it is clear that example has a comparable driving performance with respect to reference example 1.

Figure 7:
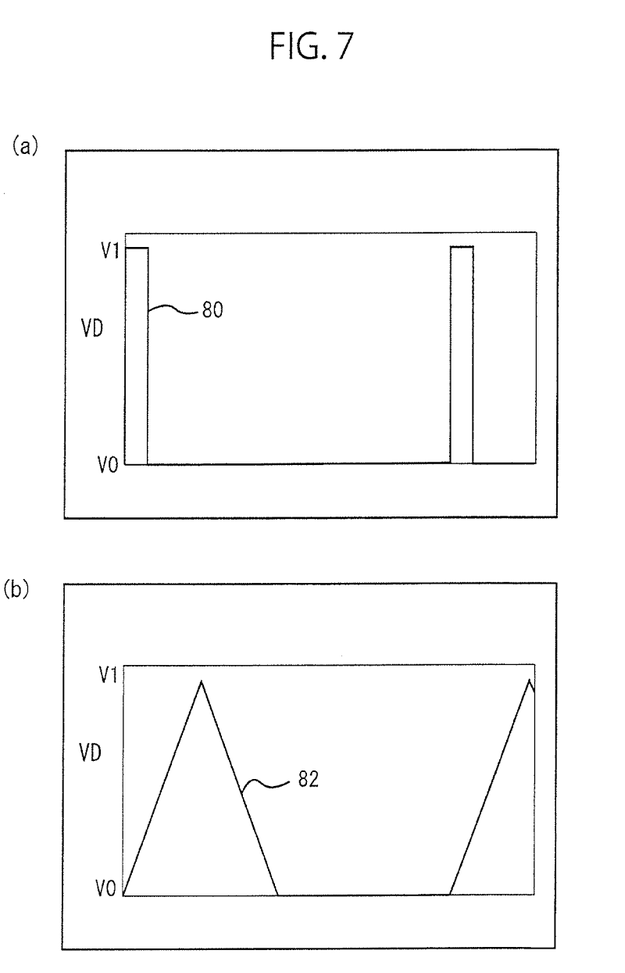
FIG. 7 is a schematic diagram showing a driving voltage waveform which is used in the driving apparatus according to reference example.

For reference example 1, as shown in FIG. 7(a), the movement speed of the movable body 20 is high since the driving voltage waveform 80 that sharply changes voltage from the standard value V0 to the first value V1 is used. However, as shown with dotted line 81 in FIG. 6, the movable body 20 largely vibrates when stopping and that causes ringing. Further, in reference example 2, as shown in FIG. 7(b), the vibration of the movable body 20 is small as shown with dashed line 83 in FIG. 6 since the driving voltage waveform 82 that slowly changes voltage from the standard value V0 to the first value V1 is used. However, the movement speed is low and the driving performance is inferior as compared with the example.

Table 1 shows measured acoustic noise (average value of 300 to 1000 Hz) under the driving according to reference examples 1 and 2.

TABLE 1

|  | Acoustic Noise (dBA) |
| --- | --- |
| Example | 11.0 |
| Reference Example 1 | 21.9 |
| Reference Example 2 | 11.5 |

As shown in Table 1, compared with the measured value of acoustic noise in the frequency band that human beings can easily hear, for the driving according to the example, ringing is drastically suppressed compared with the driving according to reference example 1. Therefore, it is clear that the example has a similar result with reference example 2.

In view of the above, the driving apparatus 10 shown in FIGS. 1 to 4 changes the voltage value of the driving pulse signals 40, 42 in accordance with the driving voltage waveform 50 that comprises a second rising portion 52 and a second dropping portion 56 where the driving voltage value VD slowly changes, and first and third rising portions 51, 53 and first and third dropping portions 55, 57 where the driving voltage value VD sharply changes. With this, the driving apparatus 10 enables to realize both ringing suppression and favorable driving performance. Therefore, in particular, the driving apparatus 10 can be preferably used as a lens driving apparatus of imaging device which is capable of taking moving images.

Further, compared with the driving apparatus that merely slowly changes the driving voltage value VD as shown in FIG. 7(b), for the driving apparatus 10, the movement speed of the movable body 20 is higher and it enables to shorten the pulse application time $\Delta tD$. Therefore, it enables a suppression of power consumption. Further, in line with shortening of the pulse application time $\Delta tD$, it enables to shorten the driving cycle of the movable body 20. For instance, when the driving apparatus 10 is used as a lens driving apparatus of imaging device, it enables to realize a higher speed autofocus performance.

Further, for the driving voltage waveform used in the driving apparatus 10, it is not limited to the bottle-shaped driving voltage waveform 50 shown in FIG. 4, and various types of alteration is possible without departing from the scope of technical idea of the present invention. Furthermore, for the specific values of the first to fifth values, V1 to V5, shown in FIG. 4, it is preferable to determine appropriate values in accordance with the movement speed that the movable body 20 requires and the silence level that the driving apparatus 10 requires. In addition, for the standard value V0 shown in FIG. 4, it can be different from the ground voltage of circuit as necessary.

EXPLANATION OF REFERENCE NUMERALS

10—driving apparatus
12—piezoelectric element
12a—first electrode
12b—second electrode
14—supporting shaft
16—weight
20—movable body
22—optical system
24—holding frame
26—engagement portion
28—movable body edge
30—driving portion
32—control portion
40—first driving pulse signal
42—second driving pulse signal
50, 80, 82—driving voltage waveform
51—first rising portion
52—second rising portion
53—third rising portion
54—voltage sustaining portion
55—first dropping portion
56—second dropping portion
57—third dropping portion
VD—driving voltage value
V0—standard value
V1 to V5—first to fifth value
VA, VB—voltage value
$\Delta tA$, $\Delta tB$—pulse width
$\Delta tC$—application cycle
$\Delta tD$—pulse application time
$\Delta tE$—pulse pause time
t1 to t5—time

The invention claimed is:
1. A driving apparatus comprising:
a piezoelectric element expanding and contracting in accordance with a driving pulse signal;
a supporting shaft connected to said piezoelectric element;
a movable body frictionally engaged with said supporting shaft and capable of moving along said supporting shaft; and
a driving portion applying said driving pulse signal having a voltage value that corresponds to a driving voltage value to said piezoelectric element in order to cause relative movement of said movable body to said supporting shaft, wherein
a driving voltage waveform showing a time-varying of said driving voltage value that is the same as or in a proportional relation to a voltage value of said driving pulse signal and is controlled by said driving portion has a first dropping portion where said driving voltage value sharply drops from any first value to a second value that is smaller than said first value, a second dropping portion where said driving voltage value drops from said second value to a third value that is smaller than said second value more slowly than said first dropping portion, and a third dropping portion where said driving voltage value drops from said third value to a standard value that is smaller than said third value more sharply than said second dropping portion.

2. The driving apparatus as set forth in claim 1, wherein
said driving voltage waveform has a first rising portion where said driving voltage value sharply rises from said standard value to a fourth value that is larger than said standard value and smaller than said first value, a second rising portion where said driving voltage value rises from said fourth value to a fifth value that is larger than said fourth value and smaller than said first value more slowly than said first rising portion, and a third rising portion where said driving voltage value rises from said fifth value to said first value more sharply than said second rising portion.

3. The driving apparatus as set forth in claim 2, wherein
said second dropping portion and said second rising portion of said driving voltage waveform have a symmetrical shape.

4. The driving apparatus as set forth in any of claims 1, wherein
said driving voltage waveform has a voltage sustaining portion where said driving voltage value is sustained at said first value between said third rising portion and said first dropping portion with respect to a time axis direction, and when a time length of said voltage sustaining portion is expressed by W1 and a time length of said second dropping portion is expressed by W2, W2/W1 is in the range of 10 to 100.

* * * * *